(12) United States Patent
Kim

(10) Patent No.: US 9,246,142 B2
(45) Date of Patent: Jan. 26, 2016

(54) SECONDARY BATTERY HAVING INTERCONNECTED POSITIVE AND NEGATIVE ELECTRODE TABS

(75) Inventor: Kwang-Chun Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 642 days.

(21) Appl. No.: 12/965,666

(22) Filed: Dec. 10, 2010

(65) Prior Publication Data

US 2011/0143194 A1 Jun. 16, 2011

(30) Foreign Application Priority Data

Dec. 16, 2009 (KR) ........................ 10-2009-0125418

(51) Int. Cl.
*H01M 2/20* (2006.01)
*H01M 2/26* (2006.01)
*H01M 2/30* (2006.01)
*H01M 2/04* (2006.01)
*H01M 10/0587* (2010.01)

(52) U.S. Cl.
CPC .............. *H01M 2/0443* (2013.01); *H01M 2/20* (2013.01); *H01M 2/263* (2013.01); *H01M 10/0587* (2013.01)

(58) Field of Classification Search
CPC ......... H01M 2/20; H01M 2/202; H01M 2/26; H01M 2/30
See application file for complete search history.

(56) References Cited

U.S. PATENT DOCUMENTS 3,161,545 A * 12/1964 Ruben ............................ 429/206
5,580,675 A * 12/1996 Rouhani ......................... 429/90
6,242,128 B1 * 6/2001 Tura et al. ...................... 429/161
6,447,946 B1    9/2002 Nakai et al.
7,618,737 B2   11/2009 Lee
2002/0039679 A1 * 4/2002 Akita et al. .................... 429/183
2006/0063068 A1 * 3/2006 Cheon et al. ................... 429/161

(Continued)

FOREIGN PATENT DOCUMENTS

JP          3777487         3/2006
KR    10-2007-0034219       3/2007

(Continued)

OTHER PUBLICATIONS

Korean Office action issued by KIPO on Dec. 22, 2011, corresponding to KR 10-2009-0125418 and Request for Entry attached herewith.

*Primary Examiner* — Barbara Gilliam
*Assistant Examiner* — Angela Martin
(74) *Attorney, Agent, or Firm* — Robert E. Bushnell, Esq.

(57) ABSTRACT

A secondary battery is capable of fastening a positive electrode tab and a negative electrode tab to each other without performing welding. The secondary battery comprises an electrode assembly including a positive electrode plate, a negative electrode plate, and a separator interposed between the positive electrode plate and the negative electrode plate, a positive electrode tab and a negative electrode tab coupled to the positive electrode plate and the negative electrode plate, respectively, a housing accommodating the electrode assembly and having one side open, a plate sealing up the open part of the housing, a fastening unit formed so as to protrude from the plate in a non-penetrating structure, and a first tab terminal inserted into the fastening unit via the positive electrode tab so as to electrically couple the positive electrode tab and the plate to each other.

15 Claims, 4 Drawing Sheets

(56) References Cited

U.S. PATENT DOCUMENTS

| | | |
|---|---|---|
| 2006/0068277 A1* | 3/2006 | Kim et al. .................... 429/161 |
| 2007/0026296 A1* | 2/2007 | Byun et al. .................... 429/72 |
| 2007/0190411 A1 | 8/2007 | Uh |
| 2007/0231686 A1 | 10/2007 | Kim |
| 2008/0070097 A1 | 3/2008 | Uh |
| 2009/0087738 A1 | 4/2009 | Kim |
| 2009/0111013 A1 | 4/2009 | Jang |
| 2009/0130552 A1 | 5/2009 | Kim |
| 2009/0130554 A1* | 5/2009 | Jang et al. .................... 429/179 |
| 2009/0155683 A1 | 6/2009 | Yoo |
| 2009/0208838 A1 | 8/2009 | Kim |
| 2009/0253043 A1 | 10/2009 | Bak |
| 2009/0317707 A1 | 12/2009 | Cha |
| 2010/0136423 A1* | 6/2010 | Seo et al. .................... 429/181 |
| 2010/0151313 A1* | 6/2010 | Kosugi .................... 429/158 |
| 2011/0135976 A1* | 6/2011 | Byun .................... 429/56 |

FOREIGN PATENT DOCUMENTS

| | | |
|---|---|---|
| KR | 10-0731415 | 6/2007 |
| KR | 10-2008-0034723 A | 4/2008 |

* cited by examiner

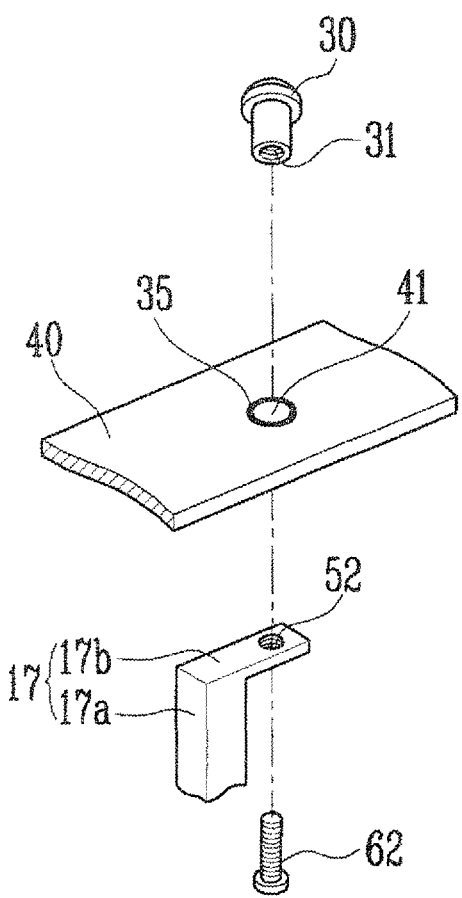

SECONDARY BATTERY HAVING INTERCONNECTED POSITIVE AND NEGATIVE ELECTRODE TABS

CLAIM OF PRIORITY

This application makes reference to, incorporates the same herein, and claims all benefits accruing under 35 U.S.C. §119 from an application earlier filed in the Korean Intellectual Property Office on Dec. 16, 2009 and there duly assigned Serial No. 10-2009-0125418.

BACKGROUND OF THE INVENTION

1. Field of the Invention

The present invention relates to a secondary battery and, more particularly, to a secondary battery capable of fastening a positive electrode tab and a negative electrode tab to either a cap plate or an external terminal without welding.

2. Description of the Related Art

Recently, as portable electronic apparatuses are being rapidly made small and light, research for secondary batteries to be used as a driving power source has increased. Nickel-cadmium batteries, nickel-hydrogen batteries, nickel-zinc batteries, and lithium secondary batteries are all used as secondary batteries.

Among the above batteries, the lithium secondary battery may be rechargeable, and may be made small while providing a large capacity. Since the lithium secondary battery has a high driving voltage and a high energy density per specific weight, the lithium secondary battery is widely used in the high-technology electronic apparatus fields. The lithium secondary battery is formed by accommodating an electrode assembly constructed with a positive electrode plate, a negative electrode plate and a separator interposed between the positive electrode plate and the negative electrode plate, in a can together with an electrolyte, and by sealing the upper end of the can with a cap assembly.

The electrode assembly is formed by winding the positive electrode plate, the negative electrode plate, and the separator interposed between the positive electrode plate and the negative electrode plate. A positive electrode tab is coupled to the positive electrode plate so as to protrude toward the upper end of the electrode assembly. A negative electrode tab is coupled to the negative electrode plate so as to protrude toward the upper end of the electrode assembly. In the electrode assembly, the positive electrode tab and the negative electrode tab are separated from each other by a predetermined distance, and they are electrically insulated from each other.

The cap assembly includes a cap plate, an insulating plate, a terminal plate, and an electrode terminal. The cap assembly is coupled to an additional insulating case so as to be coupled to the upper end opening of the can and to seal the can.

A groove for the positive electrode tab and a hole for the negative electrode tab are formed in the insulating case. The insulating case is inserted in order to prevent a short circuit between the top of the electrode assembly and the bottom of the cap assembly which are accommodated within the can. In addition, the insulating case prevents a short circuit which could occur whenever the curved negative electrode tab and positive electrode tab contact the internal wall of the can.

In a lithium secondary battery, the positive electrode tab is coupled to the cap plate by welding, the negative electrode tab is coupled to the terminal plate by welding, and the terminal plate is electrically coupled to the electrode terminal via a terminal hole through the cap plate.

However, when the positive electrode tab and the negative electrode tab are coupled to the cap plate and the terminal plate, respectively, during fabrication of the battery, process time increases. In addition, the reliability of a lithium secondary battery is compromised by the occasional poor welding.

SUMMARY OF THE INVENTION

Accordingly, the present invention has been developed to provide a secondary battery capable of fastening a positive electrode tab and a negative electrode tab to either a cap plate or an external terminal without welding.

In order to achieve the foregoing and/or other aspects of the present invention, according to the aspects and features of the present invention, there is provided a secondary battery, including an electrode assembly that has a positive electrode plate, a negative electrode plate, and a separator interposed between the positive electrode plate and the negative electrode plate, a positive electrode tab and a negative electrode tab coupled to the positive electrode plate and the negative electrode plate, respectively, a housing accommodating the electrode assembly and having one side open, a cap plate sealing up the open part of the housing, a fastening unit formed to protrude from the cap plate in a non-penetrating structure, and a first tab terminal inserted into the fastening unit via the positive electrode tab so as to electrically couple the positive electrode tab and the cap plate to each other.

The positive electrode tab is constructed with a first positive electrode tab extending so as to protrude from the positive electrode plate in the direction of the opening, and a second positive electrode tab extending from an upper part of the first positive electrode tab so as to be horizontal with respect to the plate. A first through hole is formed in the second positive electrode tab so that the first tab terminal may be inserted into the first through hole. The first tab terminal may be a fastener such as a helically threaded screw.

The secondary battery may have an electrode terminal electrically coupled to the negative electrode tab via a terminal hole of the plate and a second tab terminal inserted into the electrode terminal via the negative electrode tab. The negative electrode tab may include a first negative electrode tab extending so as to protrude from the negative electrode plate in the direction of the opening and a second negative electrode tab extending from the upper part of the first negative electrode tab so as to be horizontal with respect to the plate. A second through hole is formed in the second negative tab so that the second tab terminal may be inserted into the second through hole. The secondary battery may include a gasket inserted into the terminal hole so that the electrode terminal and the plate are electrically insulated from each other. The second tab terminal may be a threaded fastener such as a screw.

Epoxy is applied to wrap the terminal hole so that the electrode terminal and the cap assembly are electrically insulated from each other. The secondary battery has an insulating plate positioned between the cap assembly and the second tab terminal so as to electrically insulate the negative electrode tab and the plate from each other. The secondary battery has an insulating case positioned between the electrode assembly and the cap assembly. Slit holes are formed in the insulating case so that the positive electrode tab and the negative electrode tab pass through the slit holes.

In a secondary battery constructed according to the principles of the present invention, the positive electrode tab is fastened to the housing plate using a threaded fastener such as a first screw and the negative electrode tab is fastened to the electrode terminal using a threaded fastener such as a second screw. In this case, since the welding process is eliminated, processes may be simplified and reliability may be improved. In addition, according to the principles of the present invention, since the negative electrode tab is directly coupled to the electrode terminal by a second screw, the structures of the terminal plate and the insulating plate may be omitted so that manufacturing cost may be reduced.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIGS. 3A to 3C are oblique and cross-sectional views illustrating processes of coupling a negative electrode tab and an electrode terminal to each other.

DETAILED DESCRIPTION OF THE INVENTION

Figure 1:
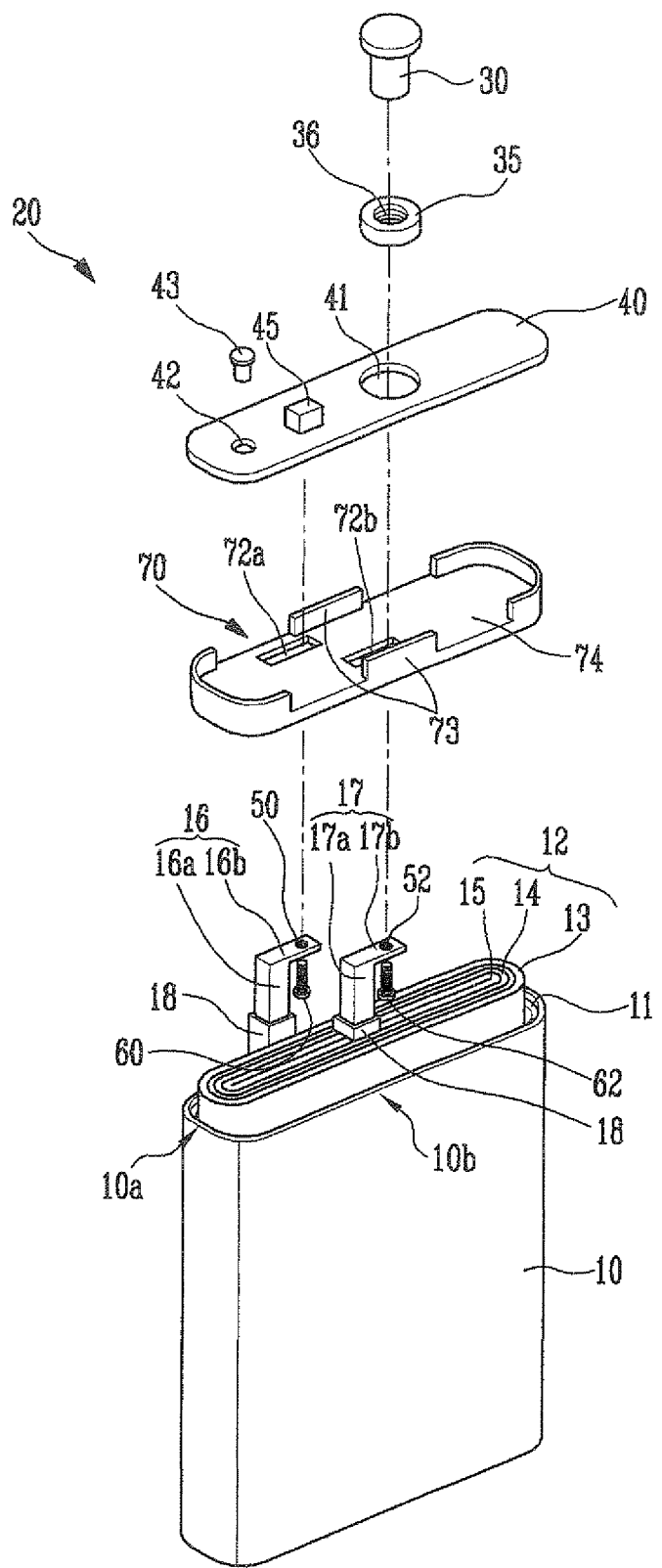
FIG. 1 is an exploded oblique view illustrating a secondary battery constructed as an embodiment of the present invention.

In the following detailed description, only certain exemplary embodiments of the present invention have been shown and described, simply by way of illustration. As those skilled in the art will realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals refer to like elements.

A secondary battery according to the present invention will now be described in detail with reference to FIGS. 1, 2A, 2B and 3A thru 3C in which the embodiments of the present invention, which can be easily performed by those skilled in the art, are illustrated.

FIG. 1 is an exploded perspective view illustrating a secondary battery according to an embodiment of the present invention.

Referring to FIG. 1, the secondary battery according to the embodiment of the present invention includes an electrode assembly 12, a housing 10, a cap assembly 20, and an insulating case 70.

The housing 10 accommodates the electrode assembly 12 on one open side. The horizontal section of the can 10, which is square-shaped so that the edges are rounded, includes a pair of short sides 10a and a pair of long sides 10b. The shape of the horizontal section of the housing 10 is not limited to the above. Although not shown, the horizontal section of the housing 10 may be square or elliptical. The housing 10 may be formed of light and flexible aluminum or an aluminum alloy. In addition, the housing 10 may be easily manufactured by a deep drawing method.

A step difference 11 is formed in the upper end of the housing 10. The cap assembly 20 to be described later is settled in the step difference 11. The step difference 11 may be formed on the short sides 10a and the long sides 10b of the housing 10. However, since the cap assembly 20 is settled in the step difference 11, the step difference 11 may be formed only in the short sides 10a of the housing 10.

In FIG. 1, the housing 10 is can-shaped. The present invention is not limited to the above, however. Actually, the present invention may be applied to secondary batteries having various shapes in which a positive electrode tab 16 and a negative electrode tab 17 protrude from the housing 10.

The electrode assembly 12 inserted into the housing 10 is formed by winding a positive electrode plate 15, a negative electrode plate 13, and a separator 14 interposed between the positive electrode plate 15 and the negative electrode plate 13. The positive electrode plate 15 and the negative electrode plate 13 are manufactured by coating an aluminum metal foil and a copper metal foil with slurry, and by drying the aluminum metal foil and the copper metal foil coated with the slurry. At this point, the slurry includes the active materials of the positive electrode plate 15 and the negative electrode plate 13 and a fixative for adhering the active materials to the metal foils. In the case of the lithium secondary battery, a lithium containing oxide is mainly used as the positive electrode active material, and hard carbon, soft carbon, graphite or carbon may be mainly used as the negative electrode active material. The present invention is not limited to the lithium secondary battery, however.

The positive electrode tab 16 is coupled to the positive electrode plate 15. The positive electrode tab 16 has an "L" shape and includes a first positive electrode tab 16a that extends substantially obliquely, or perpendicularly to, a second positive electrode tab 16b. The first positive electrode tab 16a protrudes from the positive electrode plate 15 at the upper end of the electrode assembly 12. The second positive electrode tab 16b extends from the upper end of the first positive electrode tab 16a so as to lie in a substantially parallel plane (e.g., to be approximately horizontal) with respect to the cap plate 40. The first positive electrode tab 16a is electrically coupled to the positive electrode plate 15, and the second positive electrode tab 16b is electrically coupled to the cap plate 40.

Therefore, a first through hole 50 is formed in the second positive electrode tab 16b. A first fastener such as a helically threaded screw 60 (or a first tab terminal) is electrically coupled to a fastening unit 45 of the cap plate 40 via the first through hole 50. As a result, the positive electrode tab 16 is securely and reliably mechanically and electrically coupled to the plate 40.

A negative electrode tab 17 is coupled to the negative electrode plate 13, is separated from the positive electrode tab 16 by a predetermined distance, and is electrically insulated from the positive electrode tab 16. The negative electrode tab 17 has an "L" shape and includes a first negative electrode tab 17a that extends substantially obliquely, or perpendicularly, to a second negative electrode tab 17b. The first negative electrode tab 17a protrudes from the negative electrode plate 13 at the upper end of the electrode assembly 12. The second negative electrode tab 17b extends from the upper end of the first negative electrode tab 17a so as to be horizontal with respect to the cap plate 40. The first negative electrode tab 17a is electrically coupled to the negative electrode plate 13, and the second negative electrode tab 17b is electrically coupled to an electrode terminal 30. Therefore, a second through hole 52 is formed in the second negative electrode tab 17b. A second threaded fastener such as a helically threaded screw 62 (or a second tab terminal) is electrically coupled to the electrode terminal 30 via the second through hole 52. As a result, the negative electrode tab 17 is securely and reliably mechanically and electrically coupled to the electrode terminal 30.

Furthermore, a lamination tape 18 is wound on the lower ends of the first positive electrode tab 16a and the first negative electrode tab 17a, that is, the parts withdrawn from the electrode assembly 12. The lamination tape 18 blocks the heat generated from the positive electrode tab 16 or the negative electrode tab 17.

The cap assembly 20 includes the cap plate 40, the electrode terminal 30, and a gasket 35.

The cap plate 40 seals the opening of the housing 10 so as to form one surface of the housing 10 when the cap assembly 20 is coupled to the housing 10. Therefore, the cap plate 40 may be coupled to the opening of the housing 10 using a method such as welding.

The cap plate 40 is electrically coupled to the second positive electrode tab 16b withdrawn through a first slit hole 72a of the insulating case 70. Therefore, the fastening unit 45 is formed in a position which faces the first slit hole 72. The fastening unit 45 protrudes from the cap plate 40 and has a screw groove formed in it so that the first screw 60 may be inserted into the screw groove.

In addition, a first terminal hole 41 which is coupled to the gasket 35, and an electrolyte injecting hole 42 into which an electrolyte is injected, are formed in the cap plate 40.

The first terminal hole 41 is formed in a position which faces a second slit hole 72b of the insulating case 70 and the second through hole 52. That is, the position of the first terminal hole 41 is set so that the second screw 62 may be inserted into the first terminal hole 41. The electrolyte injecting hole 42 is used as a path through which the electrolyte is injected into the housing 10. The electrolyte injecting hole 42 is sealed by a stopper 43.

The gasket 35 insulates the electrode terminal 30 and the cap plate 40 from each other. A second terminal hole 36 for coupling the electrode terminal 30 and the gasket 35 to each other is formed in the gasket 35. The electrode terminal 30 is coupled to the gasket 35 through the second terminal hole 36. On the other hand, according to the present invention, the gasket 35 may be removed and epoxy may be formed in a space between the electrode terminal 30 and the cap plate 40.

In detail, according to the present invention, the electrode terminal 30 is fastened to the second screw 62 so as to be coupled to the second screw 62, and thus the electrode terminal 30 is electrically coupled to the negative electrode tab 17. Therefore, after the electrode terminal 30 and the second screw 62 are fastened to each other, epoxy is injected into a space between the cap plate 40 and the electrode terminal 30, that is, the space of the first terminal hole 41, so as to electrically insulate the cap plate 40 and the electrode terminal 30 from each other.

The insulating case 70 is positioned between the electrode assembly 12 and the cap assembly 20 so that the electrode assembly 12 and the cap assembly 20 are electrically insulated from each other. In detail, the insulating case 70 is inserted into the upper end of the housing 10. The insulating case 70 may be square-shaped so that the edges thereof are rounded as in the formation of the horizontal section of the housing 10, and may be forcedly inserted into the housing 10 so as to be coupled to the housing 10.

The insulating case 70 is manufactured using rigid plastic resin having a high electrical insulation property. Therefore, when the insulating case 70 is inserted into the housing 10, the insulating case 70 is hardly deformed by the electrolyte, and the electrode assembly 12 and the cap assembly 20 are easily insulated from each other. However, when rigid plastic resin is used as the insulating case 70, elasticity is weak so that it is difficult to couple the housing 10 and the insulating case 70 to each other. Therefore, the insulating case 70 includes a base unit 74 and a supporting unit 73 so as to be stably coupled to the housing 10. An electrolyte injecting hole (not shown), the first slit hole 72a, and the second slit hole 72b are formed in the base unit 74.

The first slit hole 72a is positioned so as to face the first through hole 50 and the fastening unit 45. The second slit hole 72b is positioned so as to face the second through hole 52 and the first terminal hole 41.

Figure 2A:
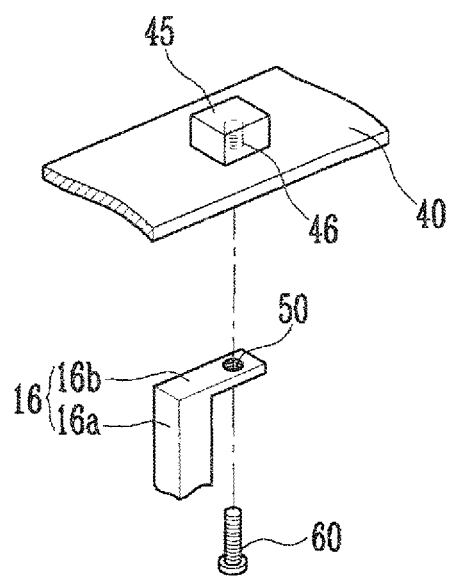
FIGS. 2A and 2B are respectively oblique and cross-sectional views illustrating processes of coupling a positive electrode tab and a plate to each other.
Figure 2B:
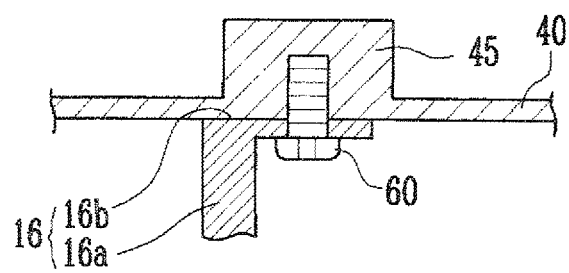

FIGS. 2A and 2B are views illustrating processes of coupling a positive electrode tab and a plate to each other. In FIG. 2B, for convenience sake, the structure of the insulating case will be omitted.

Referring to FIG. 2A, the first screw 60 is fastened to the fastening unit 45 via the first through hole 50. Therefore, a first screw groove 46 is formed in the fastening unit 45 so that the first screw 60 may be inserted into the first screw groove 46. When the first screw 60 is inserted into the first screw groove 46 via the first through hole 50, as illustrated in FIG. 2B, the positive electrode tab 16 is electrically coupled to the cap plate 40. According to the present invention, the cap plate 40 may be coupled to the positive electrode tab 16 using the first screw 60 without performing welding so that manufacturing time may be reduced and reliability may be improved. On the other hand, the fastening unit 45 formed so as to protrude from the cap plate 40 has a non-penetrating structure so that the first screw 60 is not exposed to the outside. That is, the first screw 60 is fixed to the inside of the fastening unit 45 so as not to be exposed to the outside, thereby preventing external foreign objects from penetrating the housing 10.

Figure 3B:
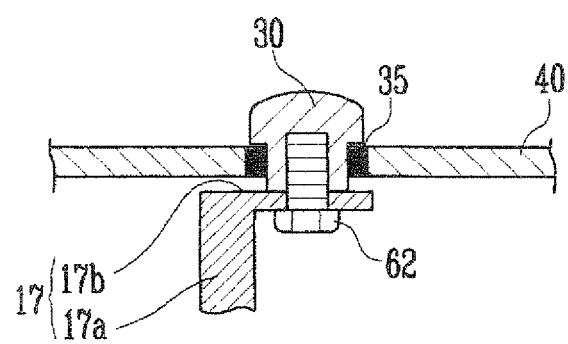
Figure 3C:
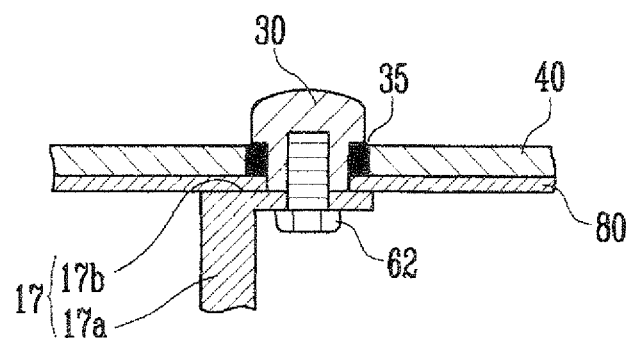

FIGS. 3A to 3C are views illustrating processes of coupling a negative electrode tab and an electrode terminal to each other. In FIG. 3B, for convenience sake, the structure of the insulating case will be omitted.

Referring to FIG. 3A, the second screw 62 is coupled to the electrode terminal 30 via the second through hole 52. Therefore, a second screw groove 31 is formed in the electrode terminal 30 so that the second screw 62 may be inserted into the second screw groove 31. When the second screw 62 is inserted into the second screw groove 31 via the second through hole 52, as illustrated in FIG. 3B, the negative electrode tab 17 is electrically coupled to the electrode terminal 30. Here, the electrode terminal 30 and the plate 40 are electrically insulated from each other by the gasket 35 (or epoxy). According to the present invention, the electrode terminal 30 may be coupled to the negative electrode tab 17 using the second screw 62 without performing welding so that manufacturing time may be reduced and reliability may be improved. On the other hand, the electrode terminal 30 has a non-penetrating structure so that the second screw 62 is not exposed to the outside. That is, the second screw 62 is fixed to the inside of the electrode terminal 30 so as not to be exposed to the outside, thereby preventing external foreign objects from penetrating the housing 10.

According to the present invention, as illustrated in FIG. 3C, an insulating plate 80 positioned between the plate 40 and the insulating case 70 (or the second screw 62) may be additionally provided. The insulating plate 80 insulates the negative electrode tab 17 and the plate 40 from each other when the negative electrode tab 17 and the negative electrode terminal 30 are fastened to each other by the second screw 62.

The foregoing paragraphs describe the details of a secondary battery that may be constructed with an electrode assembly including a positive electrode plate, a negative electrode plate, and a separator interposed between the positive electrode plate and the negative electrode plate, and a positive electrode tab and a negative electrode tab coupled to the positive electrode plate and the negative electrode plate, respectively. A housing receivingly having an open side, accommodates the electrode assembly, and a cap assembly including a cap plate sealing the open side of the housing. A fastening unit is formed to protrude from the plate in a non-penetrating structure, and a first tab terminal is inserted into the fastening unit via the positive electrode tab so as to electrically couple the positive electrode tab and the cap plate to each other.

The positive electrode tab may have a first positive electrode tab extending so as to protrude from the positive electrode plate in a direction of the open side of the housing, and a second positive electrode tab extending from distal end of the first positive electrode tab so as to lie substantially parallel against the major surface of the cap plate.

A first through hole is formed in the second positive electrode tab and the first tab terminal is inserted into the first through hole.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery, comprising:
    an electrode assembly including a positive electrode plate, a negative electrode plate, and a separator interposed between the positive electrode plate and the negative electrode plate;
    a positive electrode tab and a negative electrode tab coupled to the positive electrode plate and the negative electrode plate, respectively;
    a housing accommodating the electrode assembly and having an open side;
    a cap assembly including a cap plate sealing the open side of the housing;
    a fastening unit protruding from a top side of the cap plate and having a non-penetrating structure;
    a first tab terminal inserted into the fastening unit via the positive electrode tab to electrically connect the positive electrode tab to the cap plate;
    an electrode terminal arranged on a top side of the cap plate and being electrically insulated from the cap plate; and
    a second tab terminal to electrically connect the negative electrode tab to the electrode terminal by extending through a terminal hole perforating the cap plate and by being inserted into the electrode terminal via the negative electrode tab.

2. The secondary battery as claimed in claim 1, wherein the positive electrode tab comprises:
    a first positive electrode tab extending so as to protrude from the positive electrode plate in a direction of the open side of the housing; and
    a second positive electrode tab extending from an upper part of the first positive electrode tab so as to be horizontal with respect to the plate.

3. The secondary battery as claimed in claim 2, wherein a first through hole is formed in the second positive electrode tab and the first tab terminal is inserted into the first through hole.

4. The secondary battery as claimed in claim 1, wherein the first tab terminal comprises a screw.

5. The secondary battery as claimed in claim 1, wherein the negative electrode tab comprises:
    a first negative electrode tab extending so as to protrude from the negative electrode plate in the direction of the open side of the housing; and
    a second negative electrode tab extending from the upper part of the first negative electrode tab so as to be horizontal with respect to the cap plate, the negative electrode tab having an L-shape and being a single integrated monolithic structure.

6. The secondary battery as claimed in claim 5, wherein a second through hole is formed in the second negative tab and the second tab terminal is inserted into the second through hole.

7. The secondary battery as claimed in claim 1, further comprising a gasket inserted into the terminal hole of the cap plate and electrically insulating the electrode terminal from the cap plate.

8. The secondary battery as claimed in claim 1, wherein the second tab terminal comprises a screw.

9. The secondary battery as claimed in claim 8, wherein one end of the screw of the second tab terminal includes threads that mate with corresponding grooves on an inside of the electrode terminal.

10. The secondary battery as claimed in claim 1, further comprising an insulating plate positioned between the cap assembly and the negative electrode tab to electrically insulate the cap plate from each of the negative electrode tab and the second tab terminal.

11. The secondary battery as claimed in claim 1, further comprising an insulating case positioned between the electrode assembly and the cap assembly.

12. The secondary battery as claimed in claim 11, wherein slits are formed through the insulating case so that the positive electrode tab and the negative electrode tab pass through the slits.

13. The secondary battery as claimed in claim 4, wherein the non-penetrating structure of the fastening unit prevents the first tab terminal from being exposed to an outside.

14. The secondary battery as claimed in claim 4, wherein the fastening unit includes a screw groove that engages with threads on the screw of the first tab terminal, wherein the non-penetrating structure of the fastening unit prevents the first tab terminal from being exposed to an outside of the secondary battery.

15. The secondary battery of claim 4, the screw of the first tab terminal having a flanged portion near one end and threads on the other end, a portion of the positive electrode tab being arranged between the flange portion and the cap plate.

* * * * *